United States Patent [19]

Arora et al.

[11] Patent Number: 5,648,409

[45] Date of Patent: Jul. 15, 1997

[54] AQUEOUS SELF-DISPERSIBLE EPOXY RESIN BASED ON EPOXY-AMINE ADDUCTS CONTAINING AROMATIC POLYEPOXIDE

[75] Inventors: Kartar S. Arora, Chalfont; David I. Devore, Langhorne, both of Pa.; Reuben H. Grinstein, Tucson, Ariz.; Grannis S. Johnson, New Hope, Pa.; John G. Papalos, Ledgewood, N.J.; Shailesh Shah, Dresher, Pa.

[73] Assignee: Henkel Corporation, Plymouth Meeting, Pa.

[21] Appl. No.: 366,343

[22] Filed: Dec. 29, 1994

[51] Int. Cl.[6] .................................. C08K 3/20
[52] U.S. Cl. .................. 523/404; 523/415; 525/484; 525/504; 525/524
[58] Field of Search .................. 523/404, 415; 525/484, 504, 524

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kinnemah et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/65 |
| 4,113,684 | 9/1978 | Petrie | 260/29.2 |
| 4,116,900 | 9/1978 | Belanger et al. | 260/18 |
| 4,134,864 | 1/1979 | Belanger | 260/18 |
| 4,137,140 | 1/1979 | Belanger | 204/18 |
| 4,139,510 | 2/1979 | Anderson | 260/18 |
| 4,177,177 | 12/1979 | Vanderhoff et al. | 260/29.2 |
| 4,182,831 | 1/1980 | Hicks | 528/103 |
| 4,246,148 | 1/1981 | Shimp et al. | 260/18 |
| 4,315,044 | 2/1982 | Elmore et al. | 427/386 |
| 4,415,682 | 11/1983 | Becher | 523/403 |
| 4,420,574 | 12/1983 | Moriarity et al. | 523/404 |
| 4,420,606 | 12/1983 | Waddill | 528/111 |
| 4,421,906 | 12/1983 | Waddill et al. | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,608,405 | 8/1986 | DeGooyer | 523/404 |
| 4,608,406 | 8/1986 | Williams et al. | 523/424 |
| 4,678,712 | 7/1987 | Elliott | 428/418 |
| 4,728,384 | 3/1988 | Goel | 156/307.3 |
| 4,738,995 | 4/1988 | Kooijmans et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijams et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,118,729 | 6/1992 | Piechocki | 523/404 |
| 5,221,700 | 6/1993 | Gilbert et al. | 523/404 |
| 5,246,984 | 9/1993 | Darwen et al. | 523/404 |

FOREIGN PATENT DOCUMENTS 2127829  4/1984  United Kingdom.

OTHER PUBLICATIONS

"Water–Reducible Coatings via Epoxy Resin Modification with Jeffamine (Reg. TM) ED–2001 and Jeffamine (Reg TM) M–1000".

Technical Literature of Synthron Inc., Morgantown, North Carolina.

"Jeffamine® Polyoxypropyleamine Curing Agents for Epoxy Resins", Texaco Chemical Company.

"Advanced Amine Technology for Superior Polymers", Texaco Chemical Company, 1992.

H. Lee and K. Neville, "Epoxy Polymers," *Encyclopedia of Polymer Science and Technology*, vol. 6, pp. 209–271, John Wiley and Sons, Inc., 1967.

*Encyclopedia of Polymer Science and Engineering*, John Wiley and Sons, New York, NY, vol. 6, pp. 340–361.

W.C. Griffith, "Emulsions", *Encyclopedia of Chemical Technology*, vol. 8, pp. 900–930, John Wiley and Sons, New York, NY, 1979.

Wicks, Z.W., Jr., Jones, F.N., Pappas, S.P., *Organic Coatings: Science and Technology, vol. II, Application Properties and Performance*, John Wiley & Sons, Inc., NY, 1994, pp. 42–45.

E. Hafslund, "Distillation", *Encyclopedia of Chemical Technology*, vol. 7, pp. 849–891, John Wiley and Sons, New York, NY, 1979.

F. Standiford, "Evaporation", *Encyclopedia of Chemical Technology*, vol. 9, pp. 472–493, John Wiley and Sons, New York, NY, 1980.

*Primary Examiner*—John C. Bleutoe
*Assistant Examiner*—Randy Gulakowski
*Attorney, Agent, or Firm*—Wayne C. Jaeschke; Frank S. Chow; John Daniel Wood

[57] ABSTRACT

There is disclosed a self-disbursing curable epoxy resin composition comprising the addition product of reactants comprising (a) 1.0 reactive equivalent of an epoxy resin, (b) from about 0.40 to 0.95 reactive equivalents of a polyhydric phenol, and (c) from about 0.005 to 0.5 reactive equivalents of an amine-epoxy adduct comprising the addition product of reactants comprising 1.0 reactive equivalent of an aromatic polyepoxide and from about 0.3 to 0.9 reactive equivalents of a polyoxyalkyleneamine.

23 Claims, No Drawings

AQUEOUS SELF-DISPERSIBLE EPOXY RESIN BASED ON EPOXY-AMINE ADDUCTS CONTAINING AROMATIC POLYEPOXIDE

1. FIELD OF THE INVENTION

The present invention relates to aqueous epoxy resin dispersions based on epoxy-amine adducts containing aromatic polyepoxide and process therefor. The dispersions are useful in preparing coating compositions comprising the same.

2. BACKGROUND OF THE INVENTION

Epoxy resins have come into widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

One class of aqueous epoxy dispersions employs one or more additives, also known as dispersants or emulsifiers or surfactants, which are necessary to stabilize the epoxy resin in the dispersion or emulsion form. Representative examples include an aqueous epoxy dispersion as described in U.S. Pat. No. 3,301,804 (employing the reaction product of a boric acid ester derived from boric acid with both an alkylene glycol and a beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a non-ionic emulsifying agent), and Specialty Chemicals Bulletin SC-021 titled "Water-Reducible Coatings via Epoxy Resin Modification with Jeffamine (Reg. TM) ED-2001 and Jeffamine (Reg. TM) M-1000" available from Texaco Chemical Company, Bellaire, Tex. Another example comes from the technical literature of Synthron Inc., Morgantown, N.C., which discloses the use of PROX-E-141, a diglycidyl ether of Pluronic (Reg. TM) F88 diol (an ethylene oxide—propylene oxide—ethylene oxide block copolymer available from BASF Performance Chemicals, Parsippany, N.J.) as a reactive dispersant for epoxy resins. PROX-E-141 can act as a dispersant for epoxy resin in water, but then will react along with the epoxy resin when exposed to an amine functional curing agent.

The use of an additive to provide stability to an aqueous epoxy dispersion is preferably avoided as such additives add additional cost, formulation complexity, and may potentially interfere with the performance of a coating derived from the aqueous epoxy dispersion.

It is known to prepare aqueous epoxy dispersions from self-emulsifying epoxy resins. For example, U.S. Pat. No. 4,315,044 describes a stable epoxy dispersion composition comprising (1) an aqueous medium; and (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the molecular weight of the epoxy resin is in the range between about 500–20,000. The dispersion can also contain 1–25 weight percent based on resin solids of a water-immiscible $C_8$–$C_{20}$ aliphatic monoepoxide reactive diluent.

U.S. Pat. No. 4,608,406 describes stable aqueous epoxy resin dispersions comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenolformaldehyde novolac resin wherein the molecular weight of the epoxy resin is in the range of about 1000 to about 20,000. The stable dispersions can be modified by the addition of about 1 to about 25 weight percent of an aliphatic monoepoxide reactive diluent.

In an attempt to improve freeze-thaw stability, the stable aqueous epoxy resin dispersions can be modified by the addition of about 5–20 weight percent, based on resin solids weight, of a water-miscible solvent which, preferably, is a 2 to 8 carbon glycol or glycol ether.

There remains a need for further improvements in terms of the freeze-thaw resistance of aqueous epoxy resin dispersions, and in terms of the corrosion resistance and chemical resistance of coatings derived from aqueous epoxy resin dispersions which are adapted for application as industrial maintenance coating systems.

Accordingly, it is a primary object of this invention to provide a self-dispersing curable epoxy resin which may be dispersed in water without the necessity for an additive to stabilize the epoxy dispersion.

Another object of this invention is to provide aqueous dispersions of self-dispersing curable epoxy resins which exhibit long term stability under ambient storage conditions.

Yet another object of this invention is to provide coating compositions incorporating a self-dispersing curable epoxy resin, where the coating composition exhibits excellent properties when cured.

Other objects and advantages of the present invention shall become apparent from the accompanying description and examples.

3. SUMMARY OF THE INVENTION

According to the present invention we claim a self-dispersing curable epoxy resin composition comprising the addition product of reactants comprising (a) 1.0 reactive equivalent of an epoxy resin, (b) from about 0.40 to 0.95 reactive equivalents of a polyhydric phenol, and (c) from about 0.005 to 0.5 reactive equivalents of an amine-epoxy adduct comprising the addition product of reactants comprising 1.0 reactive equivalent of an aromatic polyepoxide and from about 0.3 to 0.9 reactive equivalents of a polyoxyalkyleneamine.

4. DETAILED DESCRIPTION OF THE INVENTION

The self-dispersing curable epoxy resin used as a starting material herein can by any one of several self-dispersing curable epoxy resins that are based upon a polyoxyalkyleneamine.

In certain embodiments, the self-dispersing curable epoxy resin based on a polyoxyalkyleneamine is prepared by reacting (a) 1.0 reactive equivalents of an epoxy resin, (b) from about 0.01 to 1.0 reactive equivalents (e.g. from about 0.4 to about 0.6 reactive equivalents or from about 0.65 to about 0.95 reactive equivalents) of a polyhydric phenol, and (c) from about 0.005 to 0.5 reactive equivalents of an amine-epoxy adduct, wherein the amine-epoxy adduct is formed upon contacting 1.0 equivalents of an aromatic polyepoxide and from about 0.3 and 0.9 reactive equivalents of a polyoxyalkyleneamine.

The use of aliphatic polyepoxide is described in co-pending application filed on Sep. 1, 1994, the disclosure of which is also incorporated herein by reference.

In yet other embodiments, the epoxy resin composition is prepared by reacting (a) 1.0 reactive equivalents of an epoxy resin, (b) from about 0.005 to 0.5 reactive equivalents of an amine-epoxy adduct, and optionally (c) from about 0.01 to 1.0 reactive equivalents of a polyhydric phenol, wherein the amine-epoxy adduct is formed upon contacting 1.0 equivalents of an aromatic polyepoxide with from greater than about 1.0 equivalents (preferably from about 1.01 to about 2.5) reactive equivalents of a polyoxyalkyleneamine.

The Polyoxyalkyleneamine

The polyoxyalkyleneamine reactant comprises one or more amino-compounds where the amino-compound comprises both an amine group and a substantially water-soluble polyether chain.

The polyoxyalkyleneamine reactant is soluble or at least partially soluble in water. Techniques to prepare suitable polyoxyalkyleneamine reactants are known in the art, and include reacting a hydroxyl group containing initiator with ethylene oxide and/or propylene oxide, followed by conversion of the resulting terminal hydroxyl group(s) to amine(s). Illustrative of the polyoxyalkyleneamine reactants employed in the invention are the Jeffamine (Reg. TM) brand of polyoxyalkyleneamines available from Texaco Chemical Company, Bellaire, Tex.

Polyoxyalkyleneamines of this invention have the structural formula $$R_1-O-R_2-CH_2CH(R_3)-NH_2$$

wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

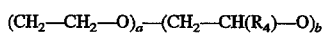
$$(CH_2-CH_2-O)_a-(CH_2-CH(R_4)-O)_b$$

wherein $R_4$ is a monovalent organic radical selected from the group consisting of $C_1$ to $C_4$ aliphatic hydrocarbons, 'a' designates a number of ethoxy groups ($CH_2-CH_2-O$), 'b' designates a number of monosubstituted ethoxy groups ($CH_2-CH(R_4)-O$) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

In certain embodiments, the polyoxyalkyleneamine is adducted with an aromatic polyepoxide and the adduct is reacted with an epoxy resin. In these embodiments, the preferred polyoxyalkyleneamines have $R_1$, $R_3$ and $R_4$ each equal to methyl, and either (i) a ratio of 'a' and 'b' of about 4:1, wherein the ethoxy and iso-propoxy groups are arranged in random blocks and the molecular weight of the polyoxyalkyleneamine is less than about 4,000, or (ii) a block of 5 ethoxy groups joined to a random sequence of ethoxy and iso-propoxy groups wherein the ratio of 'a' and 'b' in the random sequence is about 7:3 and the molecular weight of the polyoxyalkyleneamine is less than about 4,000, or (iii) a ratio of 'a' and 'b' of about 95:5, wherein the ethoxy and iso-propoxy groups are arranged substantially in two blocks and the molecular weight of the polyoxyalkyleneamine is less than about 6,000, or (iv) a ratio of 'a' and 'b' of about 7:3, wherein the ethoxy and iso-propoxy groups are present in random sequence and the molecular weight of the polyoxyalkyleneamine is less than about 4,000, or (v) a ratio of 'a' and 'b' of about 4:1, wherein the ethoxy and isopropoxy groups are present in random sequence and the molecular weight of the polyoxyalkyleneamine is less than about 4,000.

The most preferred polyoxyalkyleneamine is Jeffamine (Reg. TM) M-2070 from Texaco Chemical Company, Bellaire Tex. According to Texaco, this polyoxyalkyleneamine is prepared by reacting methanol with ethylene oxide and propylene oxide followed by conversion of the resulting terminal hydroxyl group to an amine. The most preferred polyoxyalkyleneamine has an approximate molecular weight of 2,000 and a mole ratio of propylene oxide to ethylene oxide of 10/32.

The Aromatic Polyepoxide

The aromatic polyepoxide reactant comprises one or more compounds each having a plurality of epoxide functional groups. The aromatic polyepoxide reactant has at least 2 epoxide groups present in the molecule, and may have as many as 4 epoxide groups present in the molecule. For the purpose of this invention aromatic polyepoxides are defined as glycidyl derivatives of polymeric aromatic alcohols or amines. These polyepoxides can be obtained by reaction of epichlorohydrin and polymeric aromatic alcohols or amines using known techniques. Suitable aromatic alcohols and amines are those containing more than two hydrogen equivalents capable of reacting with epichlorohydrin. Example of suitable aromatic alcohols are novolac phenolic resins and poly(vinyl phenol)s. Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane,bis(4-hydroxyphenyl)-methane, bis (4-hydroxyphenyl)sulfone, bis(4-hydroxyphenyl)sulfide, resorcinol, hydroquinone, phenol-formaldehyde novolac resins, and the like. Examples of suitable aromatic amines are 4,4-diaminodiphenylenemethane, 4,4-diaminodiphenylene sulfone, 3-aminobenzylamine, 3-phenylenediamine and 4,4-diaminoazodiphenylene.

One representative class of aromatic polyepoxide reactant according to the invention has the structural formula:

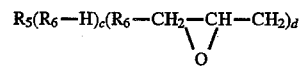
$$R_5(R_6-H)_c(R_6-CH_2-\underset{O}{CH-CH_2})_d$$

wherein $R_5$ designates an aromatic organic radical having a valency equal to the sum of 'c' and 'd', where the sum of 'c' and 'd' is equal to or greater than 2 but no more than or equal to 6 and where 'd' is equal to or greater than 2 but less than or equal to 6. The term "aromatics" embraces groups such as phenyl, napthyl, quinolyl, pyridyl, indoyl and the like in which the ring may be substituted by groups such as $C_1$ to $C_6$ alkyl, amino, nitro, halo, and the like and $R_6$ represents a divalent polyoxyalkylene chain having the structural formula:

—O—(CH$_2$—CH$_2$—O)$_e$—(CH$_2$—CH(R$_7$)—O)$_f$ wherein $R_7$ is a monovalent organic radical selected from the group consisting of $C_1$ to $C_4$ aliphatic hydrocarbons, 'e' designates a number of ethoxy groups (CH$_2$—CH$_2$—O), 'f' designates a number of monosubstituted ethoxy groups (CH$_2$—CH(R$_7$)—O) where the substitution of one monosubstituted ethoxy group is independent from the substitution of any other monosubstituted ethoxy group in the polyoxyalkylene chain, the sum of 'e' and 'f' is equal to or greater than 0 but less than or equal to 10, and where the sequence of ethoxy and monosubstituted ethoxy groups within a polyoxyalkylene chain may be completely random and/or there may be blocks of ethoxy and/or monosubstituted ethoxy groups. Typically, the average molecular weight of the polyoxyalkylene chain is from about 2,000 to 10,000.

The most preferred aromatic polyepoxides are epoxy novolac resins such as Araldite EPN 1138 and 1139, epoxy cresol novolac resins such as Araldite ECN 1235, 1273, 1280 and 1299, epoxy phenol novolac resins such as Araldite PV 720, epoxy resin 0510, Araldite MY 720 and 721, and Araldite PT 810 all of which are available from Ciba-Geigy. Tetrad C and Tetrad X resins available from Mitsubishi Gas Chemical Co. are also suitable for use in this invention.

The Epoxy Resin

The epoxy resin used in the practice of this invention comprises one or more polyglycidyl ethers of polyhydric phenols having two (2) or more epoxide groups and one (1) or more six-carbon aromatized rings present in the molecule, as represented by the structural formula:

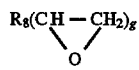

wherein $R_8$ represents a 'g' valent $C_6$—$C_{50}$ organic radical comprising at least one six-carbon aromatized ring (e.g. when g is 2, $R_8$ can be —CH$_2$—O—Æ—C(CH$_3$)$_2$—Æ—O—CH$_2$—or $R_8$ can be —CH$_2$—O—Æ—CH$_2$—Æ—O—CH$_2$— wherein Æ represents a phenyl group), and 'g' is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. TM) epoxy resins from Shell Chemical Company, Houston, Tex., and DER (Reg. TM) or DEN (Reg. TM) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid. II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl)proppane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$–$C_{18}$ (preferably $C_1$–$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl) methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The Polyhydric Phenol

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula:

$R_9(OH)_h$ wherein $R_9$ represents an 'h' valent $C_6$–$C_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland Michigan, and Shell Chemical Company, Houston, Tex.

Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

The Amine-Epoxy Adduct

The preparation of certain of the self-dispersing curable epoxy resins of the invention proceeds through an amine-epoxy adduct, where the amine-epoxy adduct is subsequently reacted with an epoxy resin and, optionally, a polyhydric phenol. The structure of the amine-epoxy adduct is dependent on the structures of the polyoxyalkyleneamine and the aromatic polyepoxide used in the preparation of the amine-epoxy adduct, as well as the relative ratio of the reactants.

An adduct formed by reacting 1.0 equivalents of an aromatic polyepoxide and from about 0.3 to 0.9 reactive equivalents, preferably from about 0.6 and 0.8 reactive equivalents of a polyoxyalkyleneamine will produce compounds having the structural formula:

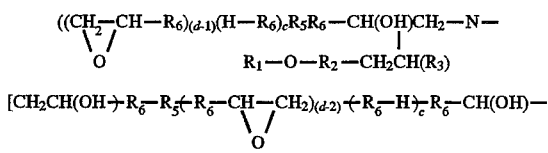

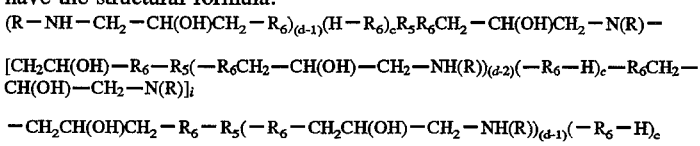

wherein
'i' indicates a number of repetitive units where 'i' is equal to or greater than zero (0) but less than or equal to about fifty.

If the adduct is formed by reacting 1.0 equivalents of an aromatic polyepoxide with from greater than about 1.0 equivalents (preferably from about 1.01 to about 2.5) reactive equivalents of a polyoxyalkyleneamine, the adduct will have the structural formula:

(R—NH—CH$_2$—CH(OH)CH$_2$—R$_6$)$_{(d-1)}$(H—R$_6$)$_c$R$_5$R$_6$CH$_2$—CH(OH)CH$_2$—N(R)—

[CH$_2$CH(OH)—R$_6$—R$_5$(—R$_6$CH$_2$—CH(OH)—CH$_2$—NH(R))$_{(d-2)}$(—R$_6$—H)$_c$—R$_6$CH$_2$—CH(OH)—CH$_2$—N(R)]$_i$

—CH$_2$CH(OH)CH$_2$—R$_6$—R$_5$(—R$_6$—CH$_2$CH(OH)—CH$_2$—NH(R))$_{(d-1)}$(—R$_6$—H)$_c$ wherein 'i' indicates a number of repetitive units where 'i' is equal to or greater than zero (0) but less than or equal to about fifty, typically from about 10 to about 20.

The Self-Dispersing Curable Epoxy Resin

Certain of the self-dispersing curable epoxy resins of the invention can be prepared by reacting an amine-epoxy adduct with a polyhydric phenol and an epoxy resin. The structure and composition of the self-dispersing curable epoxy resin will depend on the identity of the amine-epoxy adduct, the identity of the epoxy resin, the identity of the polyhydric phenol and the relative ratio of the reactants. In certain embodiments, the amine-epoxy adduct is the reaction product of (a) 1.0 reactive equivalents of an epoxy resin, (b) from about 0.01 to 1.0 reactive equivalents, preferably from about 0.4 to 0.6 reactive equivalents of a polyhydric phenol, and (c) from about 0.005 to 0.5 reactive equivalents (typically from about 0.005 to 0.05 reactive equivalents, more typically from about 0.005 to 0.025 reactive equivalents, and preferably from about 0.005 to 0.015 reactive equivalents) of aromatic polyepoxide.

The products of the above reaction are envisioned to be an extremely complex mixture of polymeric materials comprising two distinct groups. A simplified structure for each group of reaction products can be shown if it is assumed that the phenolic component is dihydric and the epoxy component is a diepoxide.

Structure [I]

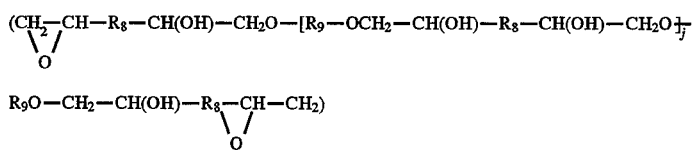

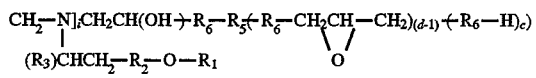

wherein

'j' indicates a number of repeating units, and is equal to or greater than zero (0) but less than or equal to twenty (20).

Structure [III]

[(GE)$_{(d-1)}$(R$_6$—H)$_c$R$_5$—R$_6$—CH$_2$—CH(OH)—CH$_2$—N—
                                                                                    |
                                                               R$_1$—O—R$_2$—CH$_2$CH(R$_3$)

-continued
Structure [III]

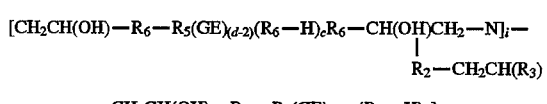

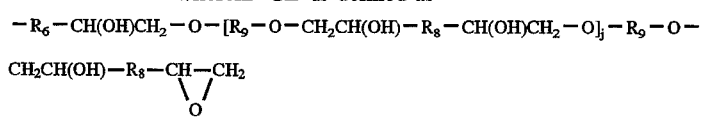

wherein 'GE' is defined as and all other variables are as defined above.

Organic Cosolvents

The self-dispersing curable epoxy resin of the present invention may be combined with a non-reactive, organic cosolvent. The cosolvent serves to reduce the viscosity of the self-dispersible curable epoxy resin before its dispersion in water as well as that of the aqueous pre-emulsion of the epoxy resin and the aqueous emulsion that is formed by reduction of the particle size of the resin in the pre-emulsion. Another function that the organic cosolvent may perform is the prevention of agglomeration of dispersed resin particles which stabilizes the dispersion of the resin. A variety of organic cosolvents are considered suitable for use in this invention. Suitable cosolvents consist of non-solvents as well as solvents for the self-dispersible epoxy resins. The cosolvent may be miscible, partly miscible or immiscible with water. Mixtures of two or more organic cosolvents can also be employed in this invention. Examples of organic cosolvents include the lower fatty acid esters or alkyl ethers of monohydric and dihydric alcohols (or polyethers thereof), wherein the alkyl group comprises $C_1-C_8$ linear or branched aliphatic or alicyclic chains and lower alkyl ketones, e.g. ketones having a total of from 3 to 6 carbon atoms, preferably methyl lower-alkyl ketones, wherein said lower alkyl group has from 1 to 3 carbon atoms.

The choice of cosolvent can affect the pot-life of the self-dispersing curable epoxy resin. For example, for a given resin it may be possible to increase the pot-life by substituting for a cosolvent such as Ektasolve EP (Eastman Chemicals) with one of the following cosolvents (the greater increase being obtained in order): 1-methoxy-2-propyl acetate, methyl n-amyl ketone, or dipropylene glycol n-butyl ether.

Reactive Diluents

The preferred stable aqueous epoxy resin dispersions of the present invention are those which contain a water-immiscible $C_8-C_{20}$ aliphatic monoepoxide reactive diluent. The said monoepoxide component can contain alicyclic and aromatic structures, as well as halogen, sulfur, phosphorus, and other such heteroatoms. Suitable reactive diluents are available from CVC Specialty Chemicals, Inc., Cherry Hill, N.J.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8-C_{10}$ aliphatic alcohols.

The presence of a water-immiscible $C_8-C_{20}$ aliphatic monoepoxide reactive diluent in an aqueous epoxy resin dispersion has significant beneficial effects in addition to modifying the viscosity of the dispersion. For example, the said water-immiscible reactive diluent appears to coat the particles of epoxy resin solids and thereby provide the aqueous dispersion with improved shear, freeze-thaw resistance, shelf viscosity stability, and paint gloss.

Also, since the reactive diluent is epoxy functional, it becomes chemically bonded into the film which is formed during the subsequent room temperature curing of the aqueous dispersion composition after it has been blended with a curing agent and coated on a surface. The total quantity of reactive diluent contributes to the calculated proportion of non-volatiles in the dispersion composition.

Preparation of the Self-Dispersing Curable Epoxy Resin

In preparing certain of the self-dispersing curable epoxy resins of this invention, an amine-epoxy adduct is first prepared by combining the polyoxyalkyleneamine reactant and the aromatic polyepoxide reactant, heating the mixture slowly to about 130° C., holding the mixture at temperature for about 2.5 hours, and then discharging the amine-epoxy adduct from the reactor. The respective self-dispersing epoxy resin is prepared by combining the amine-epoxy adduct, the polyhydric phenol and the epoxy resin, and heating the mixture in the presence of a catalyst, e.g., potassium hydroxide, triphenyl phosphine, benzyl dimethylamine and the like, to a temperature of about 150 ° C. with stirring. An exothermic reaction will then occur, and cooling is applied to maintain the reaction temperature at about 150°–160° C. The mixture is maintained at about 160° C. for about one hour subsequent to the conclusion of the exothermic reaction. If the reaction has not proceeded to the desired degree of completion (as determined by the epoxide equivalent weight of the resin), the mixture is then heated to 190° C. The mixture is then maintained at 190° C. for about 15 minutes in order to drive the reaction to the desired degree of completion, then cooled to about 160° C. whereupon a small amount of organic cosolvent is added prior to cooling and discharging the self-dispersing curable epoxy resin from the reactor.

In certain embodiments, the polyoxyalkyleneamine is reacted directly with the epoxy resin to prepare a self-dispersing curable epoxy resin. The conditions employed for such a reaction may be the similar to the conditions under which the amine-epoxy adduct is formed.

Preparation of an Aqueous Dispersion of the Self-Dispersing Curable Epoxy Resin

The aqueous epoxy dispersion of the invention can be prepared by charging the self-dispersing curable epoxy resin, as a mixture with an organic cosolvent, to a reaction vessel, then heating the resin to about 50°–100° C. with stirring. Water is then mixed with the mixture of organic cosolvent and self-dispersing curable epoxy resin to form an aqueous pre-emulsion which will typically be a disperse oil phase having a larger particle size. The relative amounts of the resin, water and organic cosolvent can vary broadly, but will typically be roughly equal, e.g. the amounts of each of resin, water and organic cosolvent will range between about 20% to about 50% each, more typically from about 35% to about 45% resin, and about 25% to about 35% each of water and organic cosolvent. More typically, however, the amount of resin will be between 20% and 70% (preferably 35% to 60% and more preferably 45% to 50%), the amount of organic cosolvent will be about 5% to about 40% (more preferably 5% to 35% and more preferably 5% to 35%), and the balance will be water. One or more reactive diluents can be mixed into the pre-emulsion prior to reduction of particle size or they can be added to the aqueous dispersion after the reduction of the particle size.

The particle size of the oil phase in the aqueous dispersion can be modified by physical techniques to reduce the particle size. The particle size reduction is preferably accomplished by subjecting the aqueous dispersion to high shear, e.g. in a homogenizer such as that disclosed in U.S. Pat. No. 4,533,254 (Cook et al.), the disclosure of which is incorporated herein be reference, and commercially available as MICROFLUIDIZER™ from Microfluidics Corporation, Newton, Mass., or in a saw-tooth blade mixer, e.g. a Fawcett air-mixer (Fawcett Co. Inc., Richfield, Ohio, USA), model 102A, fitted with a Cowles type blade (preferably operated at 60psi and a tip speed of 700 and 1700 ft/min). Homogenizers are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference. The reduction of particle size should be effective to reduce the mean (weight average) particle size of the oil phase in the aqueous dispersion to less than about 5 microns, preferably less than about 3 microns and typically less than 1 micron. e.g. typically from about 0.1 to about 3 microns.

After reduction of the particle size, at least a portion of the organic cosolvent is removed. The organic cosolvent is removed by volatilizing the same from the mixture. This is an evaporative process that may be considered a distillation. For certain applications, sufficient organic cosolvent should be removed so that the aqueous dispersion will be low in volatile organic compounds, and preferably essentially free of such compounds. Typically, less than 1%, more typically less than 0.1% by weight of organic cosolvent remains in the aqueous dispersion.

The removal of the organic cosolvent will be facilitated by subjecting an agitated dispersion to elevated temperatures and/or reduced pressures, e.g. a vacuum distillation. The precise temperature and pressure employed to effect removal of the organic cosolvent will, of course, depend upon the volatility of the organic cosolvent chosen, but temperatures that will cause degradation or polymerization of the resin should be avoided. Distillation is discussed in E. Hafslund, "Distillation", *Encyclopedia of Chemical Technology*, vol. 7, pp. 849–891 (Kirk-Othmer, eds. John Wiley & Sons, N.Y., 3d ed. 1979) and evaporation is discussed in F. Standiford, "Evaporation", *Encyclopedia of Chemical Technology*, vol. 9, pp. 472–493 (Kirk-Othmer, eds. John Wiley & Sons, N.Y., 3d ed. 1980), the disclosures of which are incorporated by reference.

The aqueous dispersion of self-dispersing resin will typically exhibit excellent chemical and physical stability over an extended shelf-life, e.g. of from five to six months. As an example of the chemical stability, the epoxide equivalent weight (EEW) of the aqueous dispersion of self-dispersing resin should remain essentially constant, e.g. should show no trend of increasing molecular weight, over a period of at least one month from the preparation of the aqueous dispersion.

Epoxide equivalent weight can be determined by differential titration with perchloric acid using crystal violet as an indicator (e.g. a first sample is titrated with 0.1N perchloric acid to an endpoint that shows the first sight of green color from the crystal violet indicator, the amine equivalent weight of the dispersion is calculated from this titration, a second sample is mixed with excess tetraethylammonium bromide and titrated with 0.1N perchloric acid to a green endpoint that persists for at least 30 seconds, total epoxide and amine equivalents are calculated from this titration, and the epoxide equivalent weight is calculated as the difference).

As an example of physical stability, the resin should not display layer formation for a period of at least one month from the preparation of the aqueous dispersion, i.e. there should be no formation of a macro-observable water phase as a layer separate from the dispersed resin phase.

Coating Compositions Comprising an Aqueous Dispersion of the Self-Dispersing Curable Epoxy Resin The coating composition of the invention is prepared by combining the aqueous epoxy dispersion with a suitable hardening agent. The coatings are tack free after 45 minutes and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula:

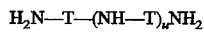

wherein 'T' is an alkylene radical containing 2 to 6 carbon atoms and 'u' is equal to or greater than zero (0) but less than or equal to five (5). Such alkylene polyamines include ethylene diamine, diethylene triamine, triethylene tetramine, tetraethylene pentamine, pentaethylene hexamine, propylene diamine, dibutylene triamine, hexamethylene diamine, and the like. Other polyamine curing agents that can be employed in the practice of this invention are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116, 900, which patents are hereby incorporated by reference.

Examples of useful curing agents also include the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one. Examples of such curing agents are described in Reference Examples 1–4, below. Another useful curing agent is the reaction product of reactants consisting essentially of: (a) an amine component consisting essentially of a mono-alkylene polyamine having less than about 12 carbon atoms (preferably a member selected from the group consisting of lower alkylene diamines, said member having from 2 to 8 carbon atoms and, more preferably, only straight-chain alkylene groups) and an alicyclic polyamine, said alicyclic polyamine being present in an amount of greater than about 10% of the amine equivalents of said amine component; (b) an aromatic mono-glycidyl ether having less than about 18 carbon atoms (preferably selected from the group consisting of mono-alkylphenyl glycidyl ethers and dialkyl phenyl glycidyl ethers having from 9 to 13 carbon atoms); and (c) a diglycidyl ether of an aromatic diol having an average degree of oligomerization of less than about 3.5 (preferably less than about 1.5, and preferably derived from an alkyl bis-phenol, e.g. bisphenol A), wherein (i) the ratio of primary amine equivalents of said alkylene polyamine to the total epoxide equivalents of said aromatic glycidyl ether and said diglycidyl ether of an aromatic diol are greater than essentially one (i.e. the molar equivalents of primary amine groups of said polyalkylene polyamine are in excess of the molar equivalents of glycidyl groups, e.g. a ratio of from about 1.5:1 to 2.5:1, preferably from about 1.75:1 to about 2.25:1), and (ii) the ratio of epoxide equivalents of said aromatic mono-glycidyl ether to epoxide equivalents of said diglycidyl ether of an aromatic diol is greater than one (preferably greater than 1.5, more preferably from about 2:1 to about 6:1, and most preferably from about 3:1 to 5:1). An example of such curing agents are described in Reference Example 5, below.

In addition to the amine curing agent, a curing accelerator can be included in the coating composition. Such an accelerator will serve to reduce the time for the coating to become tack-free. Useful accelerators for amine curing agents include tertiary amines, e.g. N,N'-bis(dimethyl-aminopropyl) urea.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde.

Particularly useful phenolplast resins are polymethylol phenols wherein the phenolic group is etherified with an alkyl, e.g., methyl or ethyl, group.

Other epoxy resin curing agents may also be useful, e.g. catalytic curing agents: Lewis bases (such as tertiary amines), Lewis acids (such as boron trifluoride), cationic curing agents (such as aryldiazonium salts, diaryliodinium salts, onium salts of Group VIa elements, especially sulfur) and reactive curing agents: mercaptans, isocyanates, carboxylic acids, and acid anhydrides. Curing agents for epoxy resins in general are discussed in the *Encyclopedia of polymer Science and Engineering*, vol. 6, pp. 340–361 (John Wiley & Sons, Inc., New York, N.Y., 1986), the disclosure of which is incorporated by reference.

The following examples are further illustrative of the present invention. The reactants and other specific ingredients are presented as being typical, and various modifications can be derived in view of the foregoing disclosure within the scope of the invention.

EXAMPLES

Example 1

Preparation of Epoxy-Amine Adduct

This example is based upon the use of aromatic polyepoxide Tetrad X available from Mitsubishi Cas Chemical Co., having an epoxy equivalent weight (hereinafter EEW) of 101. The adduct was prepared by reaction of 148.8 g (69 milliequiv.) of Jeffamine M-2070 (Texaco Chemical Co.) and 22.1 g (219 milliequiv.) of Tetrad X at 125° C. After 2.5 h of reaction the EEW of reaction product was found to be 1104. At that time reaction temperature was increased to 150° C. After 1.25 h of reaction at 150 C. EEW of reaction product was found to be 1177. The reaction mixture was then allowed to cool to room temperature. Ethyl triphenylphosphonium iodide (ETPPI, 0.8 g) was added and reaction mixture was again heated to 150° C. After 4 hours of reaction the EEW was determined to be 2364 and amine value was 1.1 milliequiv. per gram. The reaction mixture was allowed to cool at this time to obtain the epoxy-amine adduct A.

Example 2

This example is based upon the use of aromatic polyepoxide Araldite MY724 available from Ciba-Geigy. The adduct was prepared by reaction of 148.8 g (69 milliequiv.) of Jeffamine M-2070 (Texaco Chemical Co.) and 24.6 g (219 milliequiv.) of MY724 at 125 C., After eight hours of reaction at 125° C., EEW of the reaction mixture was determined to be 1712. The reaction temperature was then increased to 150° C. After 5 hours of reaction at 150 C. EEW of the reaction mixture was found to be 2200 and amine value was 0.86 milliequiv. per g. The reaction mixture was allowed to cool to obtain the epoxy-amine adduct B.

Example 3

Preparation of self-dispersible Epoxy Resin

This example illustrates the preparation of self-dispersible epoxy resin from the epoxy-amine adduct A. The epoxy resin was prepared by reaction of 257.4 g (1.32 equiv.) of D.E.R. 331 (Dow Chemical Co.), 76.0 g (0.33 mole) of bis-phenol A (BPA-157, Shell Chemical Co.), 62.0 g (26 milliequiv.) of adduct A and 0.45 g of ETPPI. After two hours of reaction at 160° C., EEW of the reaction product was 610 and amine value was 0.187 milliequiv. per g. 2-Propoxyethanol (54 g) was added slowly with stirring and the product was allowed to cool to room temperature. Solution of epoxy resin obtained above was heated to 63° C. and 94 g of deionized water was added slowly with stirring over 1.5 h. The product was then allowed to cool to 52° C. and at that stage a small sample was found to be miscible with water indicating inversion from water-in-oil phase to oil-in-water phase. More water (162 g) was added over one hour with stirring at 50° C. and then product was allowed to stir at 54°–55° C. for one hour. The resulting dispersion was allowed to cool to room temperature. This gave 653 g of a dispersion of epoxy resin with 50% solids and average particle size of two microns (determined by Microtrac II, Leeds and Northrup).

REFERENCE EXAMPLES 1–4

Curing agents were prepared by charging to a flask the amine reactants diethylenetriamine (DETA), 1,2-diaminocyclohexane (DACH), hexamethylenediamine (HMDA) in the molar amounts set forth Table 1, below, along with the solvent 2-propoxyethanol, with mixing and under dry nitrogen gas. The contents were heated to 40° C. The epoxide reactants cresyl glycidyl ether (CGE) and a bisphenol A diglycidyl ether homopolymer having an average of 1.15 bisphenol A groups per molecule and available from the Dow Chemical Co. as DER 331, were pre-mixed in the molar amounts shown in Table 1 and the pre-mixture was added dropwise to the charge flask to maintain the temperature within the flask to less than 70° C. Once the addition of epoxide reactants was complete, the flask was held at 50° C. for about 2 hours.

TABLE 1

| | Curing Agent Composition | | | | |
|---|---|---|---|---|---|
| Example | DETA (moles) | DACH (moles) | HMDA (moles) | CGE (moles) | DER 331 (moles) |
| 1 | 1.00 | 0.04 | 0.04 | 1.72 | 0.22 |
| 2 | 1.00 | 0.04 | 0.04 | 1.30 | 0.43 |
| 3 | 0.17 | 0.03 | 0.80 | 0.96 | 0.12 |
| 4 | 0.17 | 0.03 | 0.80 | 1.20 | 0.15 |

REFERENCE EXAMPLE 5

A curing agent was prepared by charging to a flask 31.8 pads by weight of a 70% by weight aqueous solution of hexamethylenediamine (HMDA) in water (22.6 parts by weight of HMDA and thus 0.389 equivalents) and 8.2 parts by weight of isophorone diamine (0.0964 equivalents) with mixing and under dry nitrogen gas. The contents were heated to about 38° C. A total amount of 9.1 parts by weight (0.0478 equivalents) of bisphenol A diglycidyl ether homopolymer having an average of 1.15 bisphenol A groups per molecule and available from the Dow Chemical Co. as DER 331, was added dropwise with mixing over sufficient time to ensure the temperature of the reaction flask did not exceed 77° C. Then a total of 35.4 parts by weight (0.191 equivalents) of cresyl glycidyl ether (CGE) was added dropwise to the flask to ensure the temperature of the reaction flask did not exceed 77° C. Once the addition of epoxide reactants was complete, 15.5 pads by weight of 2-propoxyethanol was added and the flask was held at 54° C. for about 2 hours.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A self-dispersing curable epoxy resin composition comprising the addition product of reactants comprising (a) an epoxy resin, (b) from about 0.40 to 0.95 reactive equivalents of a polyhydric phenol per reactive equivalent of said epoxy resin, and (c) from about 0.005 to 0.5 reactive equivalents of an amine-epoxy adduct per reactive equivalent of said epoxy resin said amine-epoxy adduct comprising the addition product of reactants comprising an aromatic polyepoxide and from about 0.3 to 0.9 reactive equivalents of a polyoxyalkyleneamine per reactive equivalent of said aromatic polyepoxide.

2. A composition as claimed in claim 1 wherein said epoxy resin has an epoxide equivalent weight of less than about 400 grams/equivalent.

3. A composition as claimed in claim 1 wherein said epoxy resin has an epoxide equivalent weight of from about 100 grams/equivalent to about 350 grams/equivalent.

4. A composition as claimed in claim 1 wherein said epoxy resin has an epoxide equivalent weight of from about 150 grams/equivalent to about 225 grams/equivalent.

5. A composition as claimed in claim 1 wherein said polyhydric phenol is present in a ratio of from about 0.45 to about 0.90 reactive equivalents to said 1.0 reactive equivalents of said epoxy resin.

6. A composition as claimed in claim 1 wherein said polyoxyalkyleneamine is comprised predominantly of ethyleneoxy groups.

7. A composition as claimed in claim 1 wherein from about 70% to about 95% by weight of the oxyalkylene groups of said polyoxy-alkyleneamine are ethyleneoxy groups.

8. A composition as claimed in claim 1 wherein said polyoxyalkyleneamine has the structural formula:

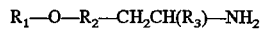

$$R_1\text{—O—}R_2\text{—CH}_2\text{CH}(R_3)\text{—NH}_2$$

wherein:

$R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

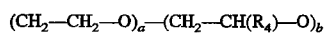

$$(\text{CH}_2\text{—CH}_2\text{—O})_a\text{—}(\text{CH}_2\text{—CH}(R_4)\text{—O})_b$$

wherein:

$R_4$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_4)O$) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

9. A composition as claimed in claim 1 further comprising between about 20–80 weight percent of a solvent phase comprising between 50 and 100 weight percent water and between 0 and 50 weight percent of organic cosolvent, and about 80–20 weight percent of said self-dispersing curable epoxy dispersion composition.

10. A composition as claimed in claim 1 wherein 0.005 to 0.025 reactive equivalents of said amine-epoxy adduct are reacted per equivalent of said epoxy resin.

11. A composition as claimed in claim 1 wherein 0.005 to 0.015 reactive equivalents of said amine-epoxy adduct are reacted per equivalent of said epoxy resin.

12. A self-dispersing curable epoxy resin composition prepared by the process of reacting in the presence of a catalyst a) an epoxy resin, (b) from about 0.01 to 1.0 reactive equivalents of a polyhydric phenol per reactive equivalent of said epoxy Eosin. and (c) from about 0.005 to 0.5 reactive equivalents of an amine-epoxy adduct per reactive equivalent of said epoxy resin, said amine-epoxy adduct comprising the addition product of reactants comprising an aromatic polyepoxide and from about 0.3 to 0.9 reactive equivalents of a polyoxyalkyleneamine per reactive equivalent of said aromatic polyepoxide.

13. An aqueous dispersion comprising a self-dispersing epoxy resin, wherein the self-dispersing epoxy resin is prepared by the steps comprising:

(a) preparing an amine-epoxy adduct by contacting a polyoxyalkyleneamine and aromatic polyepoxide, where the ratio of the reactive equivalents of the polyoxyalkyleneamine and the aromatic polyepoxide is in the range from about 0.3:1 to 0.9:1, and (b) contacting the amine-epoxy adduct with a polyhydric phenol and an epoxy resin, where the ratio of the reactive equivalents of the polyhydric phenol and the epoxy resin is in the range from about 0.40:1 to about 0.95:1, and where the ratio of the reactive equivalents of the amine-epoxy adduct and the epoxy resin is in the range from about 0.005:1 to about 0.5:1.

14. A composition as claimed in claim 13 further comprising (1) between about 20–80 weight percent of a solvent phase comprising between 50 and 100 weight percent water and between 0 and 50 weight percent of organic cosolvent, and about 80–20 weight percent of said self-dispersing curable epoxy dispersion composition.

15. A composition as claimed in claim 1 wherein said epoxy resin is a polyglycidyl ether of a polyhydric phenol.

16. A composition as claimed in claim 15 wherein said polyglycidyl ether of a polyhydric phenol is a polyglycidyl ether of a bisphenol selected from the group consisting of bisphenol A and bisphenol F.

17. A composition as claimed in claim 15 wherein said polyglycidyl ether of a polyhydric phenol is a polyglycidyl ether of bisphenol A.

18. A composition as claimed in claim 1 wherein said polyhydric phenol is selected from the group consisting of bisphenol A and bisphenol F.

19. A composition as claimed in claim 1 wherein said polyhydric phenol is bisphenol A.

20. A composition as claimed in claim 1 wherein the amount of said polyhydric phenol per reactive equivalent of said epoxy resin is from about 0.4 to 0.6.

21. A composition as claimed in claim 1 wherein said aromatic polyepoxide is selected form the group consisting of epoxy novolac resins, epoxy cresol novolac resins, and epoxy phenol novolac resins.

22. A self-dispersing curable epoxy resin composition comprising the addition product of reactants comprising (a) an epoxy resin selected from the group consisting of diglycidyl ethers of bisphenol A having an epoxide equivalent weight of from about 100 grams/equivalent to about 350 grams/equivalent, (b) from about 0.4 to 0.6 reactive equivalents of bisphenol A per reactive equivalent of said epoxy resin, and (c) from about 0.005 to 0.025 reactive equivalents of an amine-epoxy adduct per reactive equivalent of said epoxy resin, said amine-epoxy adduct comprising the addition product of reactants comprising an aromatic polyepoxide and from about 0.3 to 0.9 reactive equivalents of a polyoxyalkyleneamine per reactive equivalent of said aliphatic polyepoxide.

23. An aqueous dispersion comprising a self-dispersing epoxy resin prepared by the steps comprising:

(a) preparing a self-dispersing a self-dispersing curable epoxy resin based on a polyoxyalkyleneamine, (b) reducing the particle size of a mixture comprised of said, self-dispersing curable epoxy resin, water and an organic cosolvent, and (c) removing at least a major amount of said organic cosolvent from said mixture, after said reducing, wherein said preparing comprises first preparing an amine-epoxy adduct by contacting a polyoxyalkyleneamine and an aromatic polyepoxide, where the ratio of the reactive equivalents of the polyoxyalkyleneamine and the polyepoxide is in the range from about 0.3:1 to 0.9: 1, and then contacting said amine-epoxy adduct with a polyhydric phenol and an epoxy resin, where the ratio of the reactive equivalents of the polyhydric phenol and the polyglycidyl ether of a polyhydric phenol is in the range from about 0.01:1 to about 1.0:1, and where the ratio of the reactive equivalents of the amine-epoxy adduct and the polyglycidyl ether of the polyhydric phenol is in the range from about 0.005:1 to about 0.5:1 to produce a self-dispersing curable epoxy resin.

* * * * *